May 20, 1924.
C. GIRL
BUMPER
Filed July 23, 1923
1,494,417
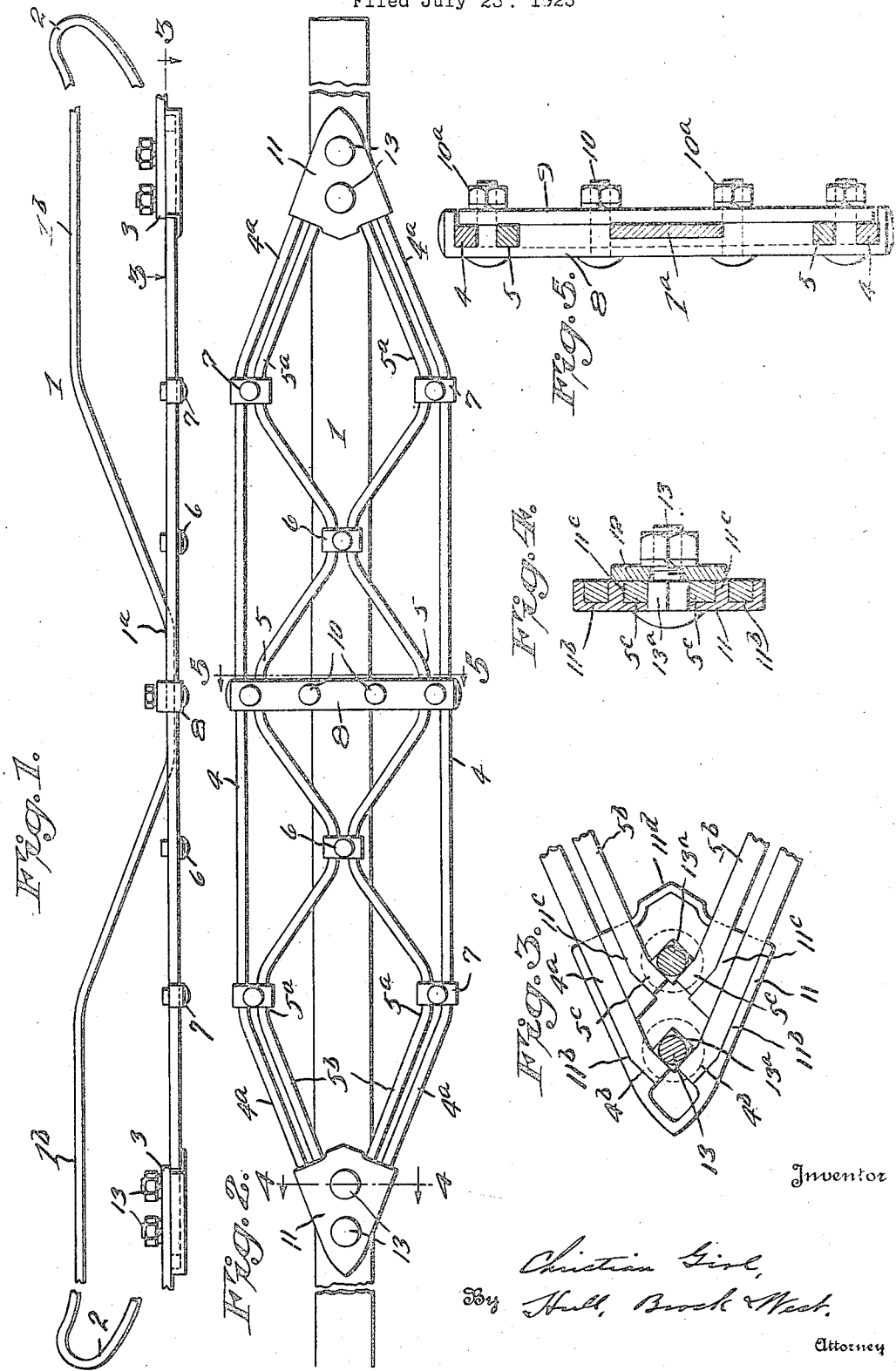
Inventor
Christian Girl,
By Hull, Brock & West.
Attorney Patented May 20, 1924.

1,494,417

UNITED STATES PATENT OFFICE.

CHRISTIAN GIRL, OF KALAMAZOO, MICHIGAN.

BUMPER.

Application filed July 23, 1923. Serial No. 653,147.

*To all whom it may concern:*

Be it known that I, CHRISTIAN GIRL, a citizen of the United States, residing at Kalamazoo, in the county of Kalamazoo and State of Michigan, have invented a certain new and useful Improvement in Bumpers, of which the following is a full, clear, and exact description, reference being had to the accompanying drawings.

This invention relates to bumpers for automobiles or similar vehicles, and more particularly to bumpers of the type wherein the central portion is widened for additional protection of such vehicles against impacts. It is the general purpose and object of the invention to provide a bumper of this type which is extremely strong and efficient in operation; which may be conveniently and quickly assembled and disassembled; which will be sightly and attractive in appearance; and which will be capable of withstanding all ordinary incidents of use.

I accomplish the foregoing object and other and more limited objects which will appear hereinafter by the construction illustrated in the drawings, wherein Fig. 1 represents a plan view of a bumper embodying my invention, the end portions of the bumper being broken away; Fig. 2, a front elevation of such bumper; Fig. 3 a sectional detail corresponding to the line 3—3 of Fig. 1; and Figs. 4 and 5 sectional details corresponding respectively to the lines 4—4 and 5—5 of Fig. 2.

Describing the parts by reference characters, 1 denotes generally a rear or supplemental bumper section, the same comprising a bar in the shape of a flat spring plate, which bar entends the full width or length of the bumper and has its end portions bent forwardly to provide loops 2, the extreme ends 3 being presented toward and spaced from each other. The central portion of the bar 1 is bent forward into a blunt V, with the central part 1ª of such V extending between the bars of the impact section. On each side of the central portion, the bar 1 is provided with transversely extending portions 1ᵇ constituting members for attaching the bumper to the vehicle side members.

The impact section comprises the front end portions of the rear or auxiliary bar, an upper and a lower bar 4, and upper and lower intermediate bars 5, 5. The bars 4 are identical in construction, each having end portions 4ª which are bent at an angle to the central portion. The bars 4 are opposed to each other, whereby the central portion of the upper bar is located above the rear bar 1 and the central portion of the rear bar is located below such bar 1, while the end portions of the two bars converge toward each other. The extreme end portion 4ᵇ of each of the bars 4 is deflected from the portion 4ª in such manner that, when the bars are assembled, these portions project toward each other at a greater angle than do the portions 4ª.

The bars 5 are identical in construction, but are reversely arranged and are so shaped as to produce, when assembled, a central diamond-shaped loop and end diamond-shaped loops, each bar 5 being provided with three generally curved portions which project upwardly and downwardly, respectively, from the upper and the lower bar, such curved portions being indicated generally at 5 and 5ª, and forming jointly the three diamond-shaped loops, as stated. The end portions 5ᵇ of the bars 5 extend substantially parallel with the end portions 4ª of the bars 4, and each bar 5 has its extreme end 5ᶜ deflected toward the corresponding end of the other bar, as is the case with the ends 4ᵇ of the bars 4. Between the loops, the bars 5 approach each other and are secured intermediate such loops by clamps 6. The upper extremities of the curves 5ª of the upper bar 5 and the lower extremities of the curves of the lower bar 5 are secured by clamps 7 to their respective adjacent bars 4.

The central portion 1ª of the plate or bar 1 extends between the central portions of the bars 4 and 5 and is secured thereto by means of a front clamping plate 8, a rear clamping plate 9, and bolts 10. The front clamping plate is provided with recessed seats for the bars 4, 5 and 1 so that, by merely setting up on the nuts 10ª, the clamping plates are secured together and the central portions of the bumper bars are firmly united.

The ends of the bars 4 and 5 are secured to the corresponding ends 3 of the bar 1 by means of suitable clamping plates, which are identical for each end of the assembly. 11 denotes a front clamping plate, which is employed at each end of the impact section, said clamping plate having an upper and a lower recessed seat 11ᵇ which are adapted and shaped to receive the parts 4ª and 4ᵇ of the bars 4. Each plate 11 also has an upper and a lower shoulder 11ᶜ against which the top and bottom portions of the upper and lower bars 5, respectively, are adapted to abut; it also has a flange 11ᵈ at its inner edge which is provided with recesses for the insertion of the parts 5ᵇ of such bars.

The parts are secured together and to the plate 11 by means of a cover plate 12 and bolts 13 connecting said plates. Each bolt has a squared projection 13ᵃ which is interposed between the two plates and which serves to engage the inner faces of the end portions 4ᵇ and 5ᶜ, thereby to lock such end portions against the shoulders which receive the opposite or outer faces of such end portions.

The construction illustrated and described herein provides a simple and efficient bumper of the type having a widened central impact portion; one which can be conveniently and quickly assembled and disassembled; and one which is particularly strong and well adapted to withstand the ordinary incidents of use. Furthermore, by the use of stock of approximately square cross-section, the widened impact section is not only strong, but graceful in appearance.

Having thus described my invention, what I claim is:

1. A bumper comprising a rear section including a bar having its ends bent forwardly and toward each other, and a central impact section connecting such ends, said impact section comprising an upper and a lower bar having their central portions offset above and below the auxiliary bar, respectively, the end portions of said bars converging, a pair of intermediate bars interposed between the first-mentioned bars and bent toward and from each other and toward and from the first-mentioned bars, and connected to the first-mentioned bars and to each other, the ends of the upper intermediate bar being directed toward the ends of the lower intermediate bar, and means connecting the ends of all of said bars to the ends of the first-mentioned bar.

2. A bumper comprising a section including a rear or auxiliary bar having its end portions bent toward and spaced from each other, an impact section comprising an upper and a lower external bar, said bars having their central portions offset respectively above and below said auxiliary bar, the ends of said bars converging toward each other, an upper and a lower intermediate bar arranged to form a plurality of loops, each loop having a portion projecting above and below the auxiliary bar, means securing the adjacent portions of the intermediate bars to each other and the portions of said bars which are adjacent to the upper and lower bars to such bars, respectively, means for securing together the central portions of the impact bars and of the auxiliary bar, and means for connecting the ends of the impact bars to the ends of the auxiliary bar.

3. A bumper comprising a pair of attaching members and a central impact section, said section comprising an upper and a lower bar having their central portions offset above and below the attaching members, respectively, the said bars having convergent end portions, a pair of intermediate bars interposed between the first-mentioned bars and bent toward and from each other and toward and from the first-mentioned bars and connected to the first-mentioned bars and to each other, and means securing the ends of all of said bars to the ends of the said members.

4. A bumper comprising a pair of attaching members and an impact section, said section comprising an upper and a lower external bar, said bars having their central portions offset respectively above and below said members, the ends of said bars being convergent each toward the end of the other bar, an upper and a lower intermediate bar arranged to form a plurality of loops, each loop having a portion projecting above and below the auxiliary bar, means securing the adjacent portions of the intermediate bars to each other, means for securing together the central portions of the impact bars and of the auxiliary bar, and means for connecting the ends of the impact bars to the said members.

5. A bumper comprising a section including a rear or auxiliary bar having its ends presented toward each other and an impact section extending between such ends, the impact section comprising symmetrical upper and lower bars and symmetrical upper and lower intermediate bars, the ends of the two first-mentioned bars being bent toward each other and the ends of the two second-mentioned bars being bent toward each other, a pair of clamping plates each having seats for the ends of the bars with which it cooperates, a cover plate for each clamping plate, and bolts for securing the cover plates to the clamping plates and the plates to the ends of the intermediate bar, each bolt having surfaces adapted to interlock with the adjacent ends of the bars of the impact section.

6. A bumper comprising a section including a rear or auxiliary bar having its ends presented toward each other and an impact section extending between such ends, the impact section comprising symmetrical upper and lower bars and symmetrical upper and lower intermediate bars, the ends of the two first-mentioned bars being bent toward each other and the ends of the two second-mentioned bars being bent toward each other, a pair of clamping plates each having seats for the ends of the bars with which it cooperates, a cover plate for each clamping plate, and bolts for securing the cover plates to the clamping plates and the plates to the ends of the intermediate bar.

7. A bumper comprising an auxiliary section having ends projected toward and spaced from each other and an impact section comprising external upper and lower bars having their central portions projecting in opposite directions, with the end portions of each of such bars converging toward the end portions of the other bar, a pair of intermediate bars between the first-mentioned impact bars and each having end portions within the end portions of the first-mentioned bars, the end portions of each of such intermediate bars projecting toward the end portions of the other intermediate bar, a clamping plate for each end of the impact section, each clamping plate having seats for the adjacent ends of the impact bars, said seats being adapted to contact with the upper and lower faces of the extreme ends of the upper and lower impact bars, a cover plate for each of the clamping plates, and bolts for securing the cover plates to the clamping plates and the impact section to the ends of the auxiliary bar, each of said bolts having surfaces adapted to contact with the bottom and top surfaces, respectively, of the ends of the upper and lower impact bars.

8. A bumper comprising an auxiliary section having ends projected toward and spaced from each other and. an impact section comprising external upper and lower bars having their central portions projecting in opposite directions, with the end portions of each of such bars converging toward the end portions of the other bar, a pair of intermediate bars between the first-mentioned impact bars and each having end portions within the end portions of the first-mentioned bars, the end portions of each of such intermediate bars projecting toward the end portions of the other intermediate bar, a clamping plate for each end of the impact section, each clamping plate having seats for the adjacent ends of the impact bars, a cover plate for each of the clamping plates, and bolts for securing the cover plates to the clamping plates and the impact section to the ends of the auxiliary section.

In testimony whereof, I hereunto affix my signature.

CHRISTIAN GIRL.